United States Patent [19]

Suzuki et al.

[11] Patent Number: 4,580,242
[45] Date of Patent: Apr. 1, 1986

[54] INFORMATION OUTPUT SYSTEM HAVING CONTROLLED DATA FORMATTING FOR EACH TERMINAL UNIT

[75] Inventors: Yuzi Suzuki; Yusuke Hino, both of Hadano, Japan

[73] Assignee: Hitachi, Ltd., Tokyo, Japan

[21] Appl. No.: 482,803

[22] Filed: Apr. 7, 1983

[51] Int. Cl.⁴ .................... G06F 3/14; G06F 3/153; G06F 3/12
[52] U.S. Cl. .................... 364/900; 340/735; 340/799; 364/518
[58] Field of Search ... 364/200 MS File, 900 MS File, 364/518-521, 523; 400/124; 340/721, 735, 750, 798, 799

[56] References Cited

U.S. PATENT DOCUMENTS

| | | | |
|---|---|---|---|
| 3,872,444 | 3/1975 | Cleveland et al. | 364/200 |
| 4,197,590 | 4/1980 | Sukonick et al. | 364/900 |
| 4,338,599 | 7/1982 | Leininger | 340/721 |
| 4,342,052 | 7/1982 | Rackley et al. | 358/287 |
| 4,386,410 | 5/1983 | Pandya et al. | 364/518 |
| 4,463,417 | 7/1984 | Bushaw et al. | 364/200 |
| 4,468,755 | 8/1984 | Iida | 364/900 |
| 4,469,460 | 9/1984 | Hughes et al. | 400/322 |
| 4,500,956 | 2/1985 | Leininger | 364/200 |

OTHER PUBLICATIONS

D. O. Hayes et al., Standard Printer or I/O Adapter Control Method & Apparatus, IBM Technical Disclosure Bulletin (vol. 22, No. 1, Jun. 1979), pp. 269-271.

Primary Examiner—James D. Thomas
Assistant Examiner—A. Williams
Attorney, Agent, or Firm—Antonelli, Terry & Wands

[57] ABSTRACT

An information output system includes a display unit and a printer for visibly outputting data has a control unit for controlling these units. In each display unit or printer, the outputted data is controlled by an arbitrary mode among a plurality of predetermined modes concerning the data display format. For this purpose, the control unit includes a rewritable table for specifying the number of data to be outputted, i.e., the picture size for each unit. If a picture size mode is specified corresponding to a unit, that unit visibly outputs the data according to its picture size mode. Also, in the case where the contents displayed on a display unit are to be printed on a printer to yield a hard copy, it is possible to print the contents with the picture size mode of the printer matched to that of the display unit by referencing the rewritable table.

6 Claims, 10 Drawing Figures (a) HOST 1
(b) TCE 2
(c) TERMINALS 30 AND 40

(DATA FORMAT FROM HOST TO TCE)

(DATA FORMAT FROM TCE TO WS)

PROCESSING FLOW IN TCE

PROCESSING FLOW IN TERMINAL UNIT

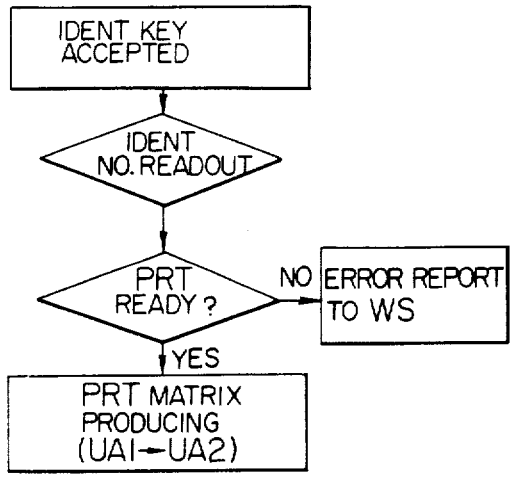
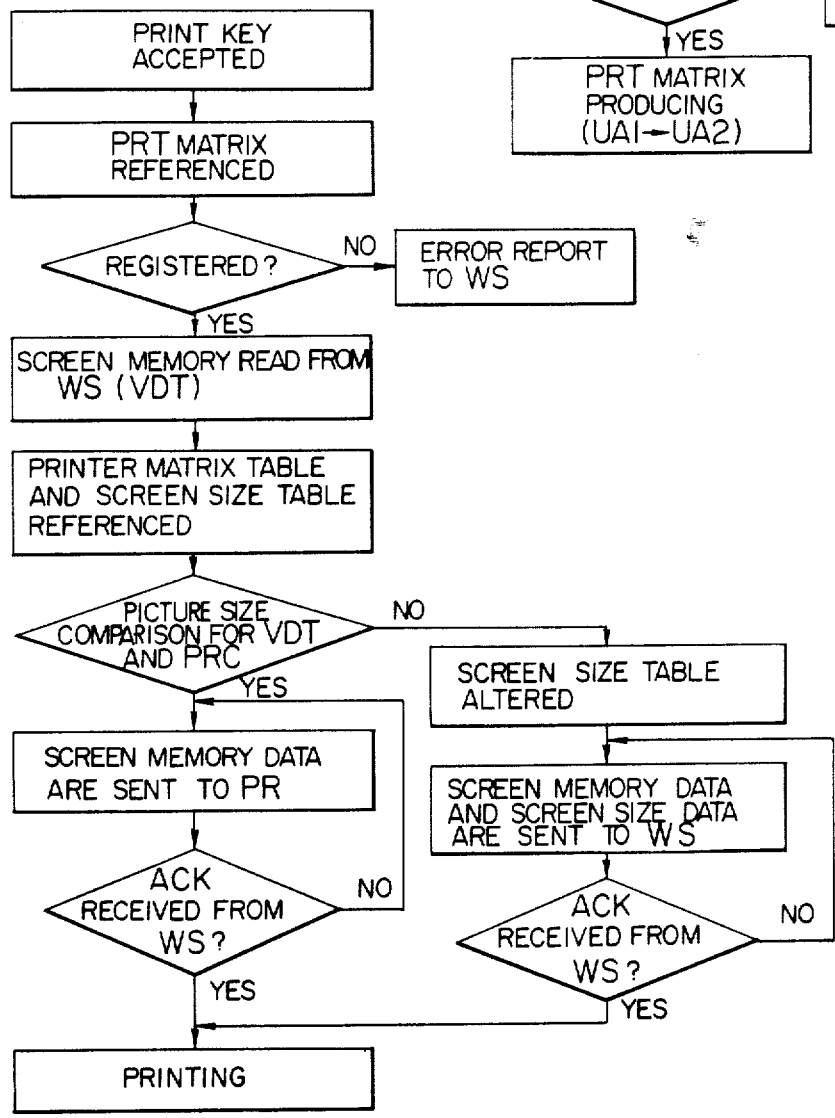

INFORMATION OUTPUT SYSTEM HAVING CONTROLLED DATA FORMATTING FOR EACH TERMINAL UNIT

BACKGROUND OF THE INVENTION

The present invention relates to an information output system and more particularly relates to an information output system having a character display unit or a printer as its information output unit.

As a general unit for yielding visible outputs of characters formed by dot patterns, a terminal unit comprising a character display unit such as a CRT display and a printer such as a line printer, ink jet printer, or a wire matrix type printer is known. Such a terminal unit may be used as an off-line output unit. In general, however, a system wherein such a terminal unit is connected to a host, such as a central processing unit or a terminal control unit, to form a terminal system and the data edited by the host is outputted to a character display or a printer of the terminal unit in an on-line approach is well known.

In such a known information output system, a CRT display which is able to display 80 characters per line is the most widely used as the character display unit and a serial printer of the wire dot matrix type which is able to print 132 characters per line (hereafter simply referred to as "printer") is the most widely used. When the contents of a picture on the CRT display composed of 80 characters by 24 lines, for example, are to be outputted on the printer as a hard copy in the off-line approach, the 80 characters by 24 lines are printed as they are. On the other hand, a printer is also known which is able to print 132 characters per line under control of a control circuit by receiving the data which has been edited in the form of 132 characters per line beforehand in the host and transferred to the serial printer.

Recently, various kinds of paper and slips are loaded on a printer and in many cases it is desired to arbitrarily change the output format on the printer. For instance, it may be desired to print the data in the form of 132 characters per line whereas the data is displayed in the form of 80 characters per line on the CRT display.

In the conventional information output system, the above described requirement is satisfied by providing an application program in the host. The application program is composed of the picture design of the CRT display for displaying 80 characters per line, printer output design for printing 132 characters per line, and a program for converting the text form of 80 characters per line into the text form of 132 characters per line. When the contents of a displayed picture are to be printed on the printer, the data represented in the 80-character form are successively converted into the 132-character form by this program. The data thus converted is transferred to the printer and printed in the form of 132 characters per line under the control by a control character.

However, such an approach has drawbacks in that the application program in the host has an increased number of steps and is complicated and that it takes a relatively long time to convert the output data.

As a solution to prevent the above described drawbacks, the following approach which is not known can be conceived. That is to say, a CRT display which is able to display the data in the form of 132 characters per line and a printer which is able to effect hard copy printing in the form of 132 characters per line are additionally connected to the above described output system. According to the print format of the paper loaded on the printer, let us consider for example a method wherein the operator specifies each time through the keyboard or the like either a CRT display of the 80-character form or the CRT display of the 132-character form.

However, preparation of fixed-form CRT displays and printers according to the demanded display format and print format each time brings about an uneconomical and inflexible system. In addition, it is very troublesome for the operator to specify each time a printer and a CRT display for exclusive use according to the required display format or print format. Further, the operator may commit an error in specification. For instance, if a printer of 132 characters per line is specified as a printer for hard copy through a mistake whereas the picture on the CRT display comprises 80 characters per line, the print data becomes confused and illegible.

SUMMARY OF THE INVENTION

An object of the present invention is to provide an information output system wherein the number of data outputted per line can be arbitrarily altered in outputting data such as characters or symbols to an output unit, such as a display unit or a printer.

Another object of the present invention is to provide an information output system wherein data can be printed with a print output mode of the printer which is automatically matched to the display mode of the display unit.

Still another object of the present invention is to provide an information output system wherein a terminal unit including devices such as a display unit or a printer is connected to a control unit, the number of displayed or printed data per line can be arbitrarily controlled by the control unit, the data can be processed in the on-line approach according to the display or print format, and the contents displayed on the display unit can be outputted onto the printer in the off-line approach to provide a hard copy.

A preferred embodiment according to the present invention is formed by a system comprising terminal units such as display units and printers for visibly outputting data and a control unit for controlling these terminal units. Each terminal unit and the control unit have memories for storing the data to be outputted as character codes. These character codes are read out from the memory, transferred to the terminal unit, and usually transformed into character patterns in the terminal unit to be outputted to the display device and the print device.

Out of a plurality of modes for defining the picture size which is represented by the number of characters displayed on each display device or printed on each printer, one mode is selected. In a preferred embodiment, only one mode for the picture size can be selected out of four modes, i.e., 960 characters (80 characters/line by 12 lines), 1,920 characters (80 characters/line by 24 lines), 2,560 characters (80 characters/line by 32 lines) and 3,432 characters (132 characters/line by 26 lines).

A picture size mode for the terminal unit is specified in the control unit. That is to say, the control unit includes a first table which stores the screen size mode control information for each terminal unit address. The screen size mode control information specifies a screen size mode for outputting the data out of the above described four modes. When the data stored in the memory of the control unit is transferred to a terminal unit to be displayed or printed, the screen size mode control information corresponding to the terminal unit address is also transferred from said first table to said terminal unit. In the terminal unit, the control information and data are once stored into the memory. Based on the control information, the data to be displayed or printed is edited into a particular screen size and thereafter transformed into character patterns, for example, to be outputted. Out of the screen size modes stored in the aforementioned first table of the control unit, an arbitrary mode can be selected according to the specification issued from the host or an input unit. Therefore, it is possible to predetermine an arbitrary one of the above described modes by the display mode of the display unit or the print mode of the printer. As a result, it is possible to select one out of a plurality of numbers of character patterns outputted per line of the output format for the display device or print device.

In addition, the present invention may be effectively applied to the case where the contents displayed on a display unit are printed on a printer to yield a hard copy. The control unit has a second table for registering a terminal unit address, which is normally a printer address, to which the data is transferred corresponding to each terminal unit address. The contents of the second table can be arbitrarily altered by specification fed from an input unit such as a keyboard. When the contents displayed on a display unit are to be outputted to a printer which has been specified by a keyboard, at first a printer which is the destination of the contents is searched in said second table. In addition, said first table is searched to compare the screen size mode of the display unit with that of the specified printer. In case of agreement between both modes, the contents displayed on the display unit are outputted to the printer without modification. In case of disagreement between both modes, the screen size mode corresponding to the printer address stored in the above described first table is rewritten in order to match the screen size mode of the printer to that of the display unit. In the printer, the data received directly or indirectly through the control unit from the display unit is re-edited according to the screen size mode control information and printed by using known means. In this way, it is possible to specify the data output format of a terminal unit according to that of another terminal unit.

BRIEF DESCRIPTION OF THE DRAWINGS

FIG. 7a and FIG. 7b are processing flow charts for off-line hard copy printing.

DESCRIPTION OF THE PREFERRED EMBODIMENT

A preferred embodiment of the present invention will be hereafter described with reference to the drawings.

Figure 1:
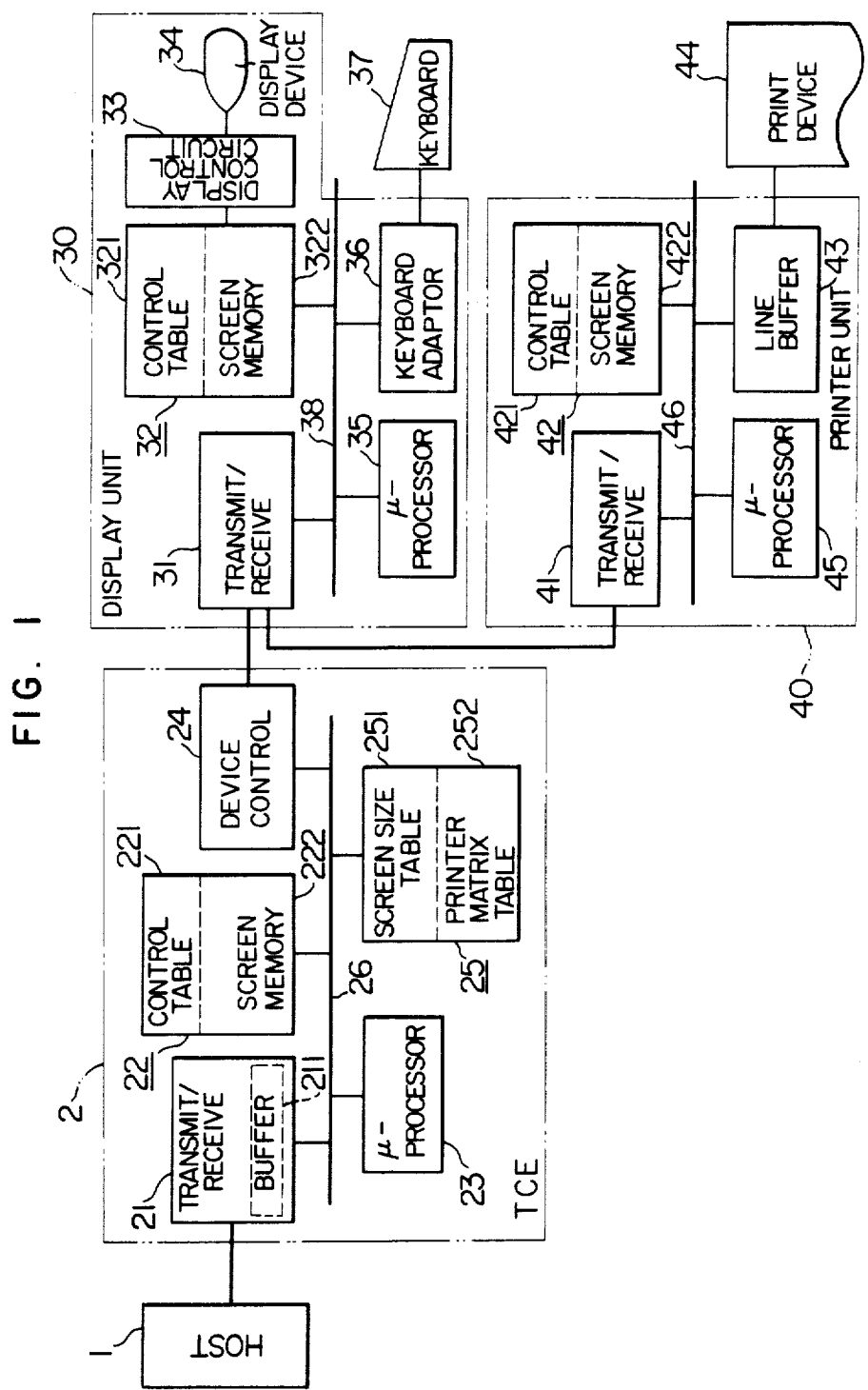
FIG. 1 shows a block diagram of an embodiment of an information output system according to the present invention.

FIG. 1 shows a block diagram of an information output system whereto an embodiment of the present invention may be applied. This system is mainly composed of a host 1 such as a central processing unit, a terminal control unit (TCE) 2, a plurality of terminal units used as work stations, which are in this embodiment a display unit (VDT) 30 and a printer (PR) 40, and communication lines or cables for interconnecting the above described components.

In the host 1, various functions of data processing are carrried out. The resultant data is transferred to the TCE 2 to be outputted to the display unit 30 or the printer 40. As well known, the data transfer from the host 1 to the TCE 2 is carried out according to the procedure shown in FIG. 2. The SEL code is transmitted from the host 1 to the TCE 2 as the request to send. After receiving the SEL code, the TCE 2 returns the ACK code as the acknowledge signal. Then, the host 1 transmits the text to the TCE 2. The SEL code includes the address of a terminal unit whereto the data is to be outputted. The address is used for picture size establishment which will be described later.

Figure 3A:
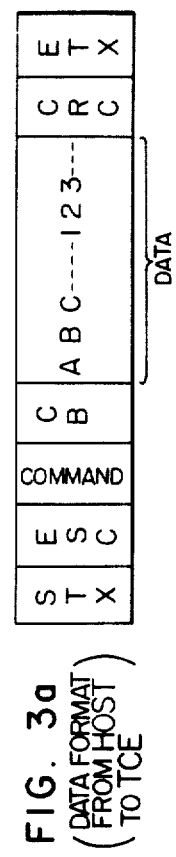
FIG. 3a shows the format of data transferred between the host and TCE.

In the data format of the text transmitted from the host 1 to the TCE 2 as shown in FIG. 3a, a text start code STX is followed by a command code ESC, a command, a control byte CB, the data to be displayed or printed, a check code CRC and a text end code ETX. The above described "command" means a command for operation to be executed in the dispaly unit 30 or the printer 40. Among various commands, a command for specifying the variability of the displayed screen (buffer) is effective especially in this embodiment. This command is referred to as the erase/write command. In a concrete form, control of variable screen size is carried out by the control byte CB which is composed of 2 bytes, for example. The control byte specifies one screen size out of a plurality of screen sizes which have been specified beforehand in addition to the control character function and print start of the printer 40. In this embodiment, a plurality of numbers of characters can be displayed on the screen of the display device 34 such as a CRT display which will be described later. That is to say, it is possible to select a number of characters which can be displayed on a screen out of 960 characters (80 characters/line by 12 lines), 1,920 characters (80 characters/line by 24 lines), 2,560 characters (80 characters/line by 32 lines), and 3,432 characters (132 characters/line by 26 lines). This selection operation is carried out by the erase/write command and the control byte CB.

The text having the data format illustrated in FIG. 3a is transmitted from the host 1 to a transmit/receive circuit 21 provided in the TCE 2. The transmit/receive circuit 21 controls the transmission/reception of the data to/from the host 1. In the transmit/receive circuit 21, a transmit/receive buffer 211 is provided for temporarily storing the transmit/receive data. The data which has been received from the host 1 is temporarily stored in this buffer 211. Thereafter, the received data is subjected to the CRC check in the transmit/receive circuit 21. If the result is correct, a receive completion interrupt is issued to a microprocesser 23 which will be described later. If the result is incorrect, an error answer NAK is returned to the host 1 for data retransmission. In the TCE 2, a memory 22, a microprocessor 23, a device control circuit 24 and a memory 25 in addition to the transmit/receive circuit 21 are connected to a common bus 26. The memory 22 is composed of a control table 221 and a screen memory 222. The control table 221 is used as an inteface buffer for data transfer to/from a terminal unit such as a display unit 30 and a printer 40. The control table 221 stores the aforementioned control byte CB as the control information. The control byte CB has been selected from a screen size table which will be described later. The screen memory 222 temporarily stores data to be displayed on the screen of the display device 34 or print data to be printed on the print device 44. Basically, the data is stored in the display form on the display screen as character codes. In the case that the screen is to be displayed or printed in one of various sizes such as 1,920 characters (80 characters/line by 24 lines) or 3,432 characters (132 characters/line by 26 lines), characters as many as the number indicated by the size are stored in this screen memory 222.

The microprocesor 23 performs various data processing operations for outputting data received from the host 1 toward a terminal unit. Upon receiving the receive completion interrupt issued from the transmit/receive circuit 21, the microprocessor 23 reads out and interprets the data which has been already stored in the transmit/receive buffer 211, byte by byte. As a result of the interpretation, the control byte CB is stored into the screen size table 251 which will be described later and display data as well as print data are converted into internal character codes. The resultant character codes are stored into the above described screen memory 222. When all of the data within the transmit/receive buffer 211 has been stored into the screen memory 222, the microprocessor 23 starts the device control circuit 24.

Figure 3B:
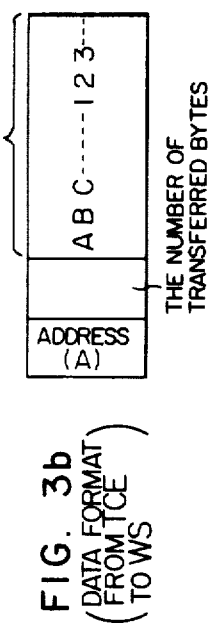
FIG. 3b shows the format of data transferred between the TCE and a terminal unit (work station).

The device control circuit 24 controls data transfer between the TCE 2 and a terminal unit such as the display unit 30 or the printer 40. In the TCE 2, the device control circuit 24 controls readout and transfer for the control information stored in the control table 221 and character codes stored in the screen memory 222. The format of data transferred from the TCE 2 to a terminal unit which is a work station is mainly composed of a terminal address A, the number of transferred bytes and data as shown in FIG. 3b. It is a matter of course that prior to the data transfer, the control information including the terminal address, a command for specifying write/read, a top address of a screen memory for read/write placed in the terminal unit, and the number of transferred bytes is sent from the TCE 2 to the terminal unit.

A screen size table 251 and a printer matrix table 252 included in the memory 25 perform functions which are characteristic of this embodiment. The memory 25 is separated from the memory 22 in FIG. 1. However, the memory 25 may be included in the physically same memory as the memory 22. That is to say, the memory 25 and the memory 22 may be included in one RAM.

The screen size table 251 specifies the number of data (hereafter also referred to as "screen size") for the display data or print data to be outputted for each terminal unit. In addition, the terminal addresses "1" and "2" have been specified beforehand respectively corresponding to the display unit 30 and the printer 40. Such size information is stored in storage location corresponding to each terminal unit address. On the other hand, a screen size can be arbitrarily chosen out of four sizes by the control byte CB as described before. When a screen size is specified in the on-line approach by the host 1, a terminal unit address within the table 251 is specified by the terminal address within the SEL code received as the request to send. A control byte within the text received thereafter from the host 1 addressed by the address is set into a screen size area corresponding to the address without being modified. Thereby, the number of output characters per line on the display unit 30 or the printer 40 whereto the data is to be outputted is specified. For off-line processing, the TCE 2 checks the power on-off status of a terminal unit. For example, when turn-on of power for the display unit 30 has been recognized, the TCE 2 can forcibly initialize a control byte CB indicating a screen size, which has been previously chosen out of four screen sizes, into a screen size area corresponding to the terminal address "1" on the display unit. Of course, the contents of the table 251 can be successively rewritten.

The printer matrix table 252 is a table for defining a printer to print the data. In the table 252, the terminal unit address of a printer to print the data is registered for each terminal unit address. When the data from the display unit 30 having the terminal address "1" is to be outputted to the printer 40 having the terminal address "2", the address "2" of the printer 40 is registered into the address "1" corresponding to the display unit 30 on the table 252. Of course, it is possible to sequentially alter this correspondence by using the system composition specification fed from the keyboard 37. When a printer to which the data is to be outputted is not registered, the value $(FF)_{16}$ is written there.

Composition of the display unit 30 will now be described. In the display unit 30, a transmit/receive circuit 31, a memory 82, a microprocessor 35, a keyboard adaptor 36, and so on are connected to a common bus 38. The transmit/receive circuit 31 controls data transfer from the TCE 2 via the device control circuit 24 and data transfer to the printer 40 via a transmit/receive circuit 41. That is to say, when the data to be displayed is transferred from the TCE 2 to the display unit 30 and the data to be printed is transferred from the TCE 2 to the printer 40, the transmit/receive circuit 31 controls the transfer of data represented in the data format as shown in FIG. 3b. For the off-line use, the transmit/receive circuit 31 controls data transfer from the display unit 30 to the printer 40 for yielding the hard copy.

The memory 32 has a similar configuration as that of the memory 22 in the TCE 2 and is composed of a control table 321 and a screen memory 322. The contents of the control table 221 received from the TCE 2 through the transmit/receive circuit 31, i.e., the screen size control information is stored into the control table 321. The contents of the screen memory, i.e., character codes to be displayed are stored into the screen memory 322.

The contents of the screen memory are controlled by the control information stored in the control table 321 and transformed into dot patterns in the display control circuit 33 to be displayed on a display device 34. The constitution of the display control circuit 33 will be later described in detail by referring to FIG. 4.

When all of the data has been stored in the above described memory 32, an interrupt signal for reception completion is issued from the transmit/receive circuit 31 to the microprocessor 35. The microprocessor 35 performs the display control for the display unit 30 and input control for the data inputted from the keyboard 37. Especially when the above described interrupt signal has been accepted, the microprocessor 35 controls the display control circuit 33 according to the control information stored in the control table 321.

When the display device 34 is used, usually the keyboard 37 is needed as its input means. Therefore, the keyboard 37 is connected to the bus 38 through the keyboard adaptor 36. From this keyboard 37, the usual data input as well as a control signal such as a print start signal for printing the contents of the screen memory 322 on the printer 40 or a signal for specifying a printer to print the data are inputted.

Figure 4:
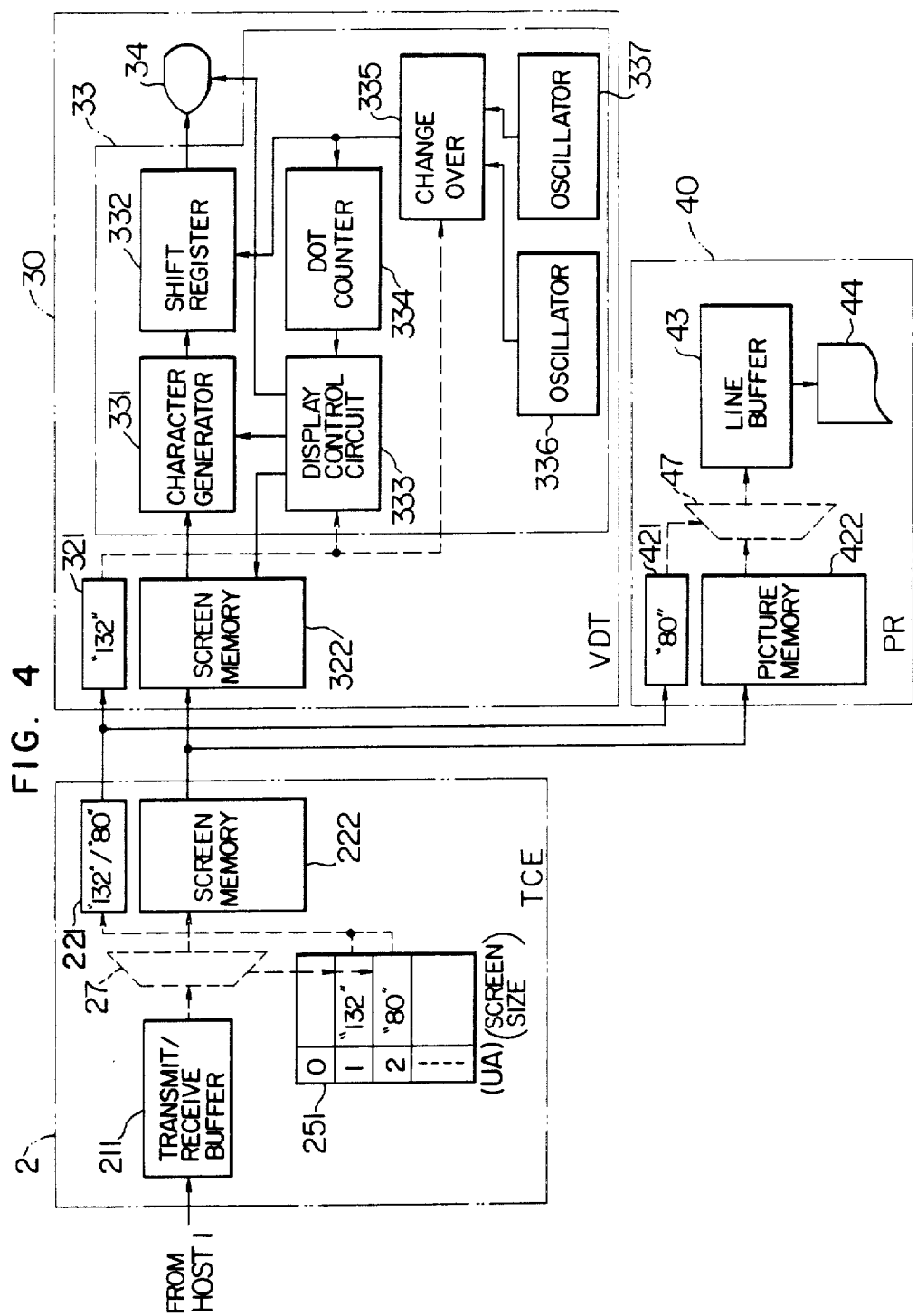
FIG. 4 and FIG. 5 mainly illustrate a block diagram of a data processing portion in the TCE and a terminal unit.

The display control circuit 33 will now be described referring to FIG. 4. FIG. 4 is a block diagram mainly for illustrating the data flow. The same block as that in FIG. 1 is provided with an identical reference numeral. The display control circuit 33 is enclosed by a dotted chain line in the display unit 30.

The control information for specifying the screen size stored in the aforementioned control table 321 is given to a display control circuit 333 and a changeover circuit 335. In this embodiment, there are four kinds according to the number of characters displayed on the display screen. The variation is mainly caused by the difference in the number of characters per display line, i.e., 80 or 132 characters, and additionaly caused by the number of display lines.

The display control circuit 333 gives an address to the memory 32 in order to read/write the information within the control table 321 and the screen memory 322. This address is sequentially updated by dot counter 334. Accordingly, character codes are successively read out from the screen memory 322 to be sent to a character generator 331. The display control circuit 333 also sends out synchronization signals to the character generator 331 and the display device 34. Especially, according to the control information stored in the control table 321, the display control circuit 333 specifies the number of characters per display line, i.e., 80 or 132. And, according to the character clock fed from the dot counter 334, the display control circuit 333 generates an address signal for the screen memory 322, a raster address signal for the character generator 331, and horizontal and vertical synchronization signals for the display device 34.

Oscillators 336 and 337 always generate signals which differ in the oscillation frequency. That is to say, the oscillator 336 generates a timing signal corresponding to the display in the form of 80 characters per display line and the oscillator 337 generates another timing signal corresponding to the display in the form of 132 characters per line. In other words, the repetition period of the timing signal generated by the oscillator 337 is shorter than that of timing signal generated by the oscillator 336.

According to the control information for specifying the screen size fed from the control table, the changeover circuit 335 selects either the timing signal fed from the oscillator 336 or that fed from oscillator 337. If the control information specifies the form of 80 characters/line, the signal fed from the oscillator 336 is selected. And if the control information specifies the form of 132 characters/line, the signal fed from the oscillator 337 is selected.

Based upon the selected timing signal, counting in the dot counter 334 and shifting in a shift register 332 are controlled.

The dot counter 334 repeats its count operation based upon the above described timing signal. In the case that the character pattern is formed by 7 vertical dots by 5 horizontal dots, for example, the dot counter is initialized to send out a signal to the display control circuit 333 whenever the counted value has reached "5". Whenever the display control circuit 333 receives the signal fed from the dot counter 334, it updates the address for the screen memory 322 to successively read out character codes. Since the timing period for the display in the form of 132 characters/line is shorter than that in the form of 80 characters/line, the counting operation in the dot counter 334 as well as a raster counter and a line counter which are not illustrated is carried out relatively fast.

As well known, the character generator 331 stores a number of character patterns which can be outputted to the display. In this embodiment, the character pattern is stored as the dot pattern composed of 7 vertical dots by 5 horizontal dots per character, for example. Character patterns corresponding to character codes outputted from the above described screen memory 322 are successively outputted to be temporarily stored into the shift register 332.

In this embodiment, character patterns corresponding to up to 132 characters can be stored in the shift register 332. In case of display in the form of 80 characters/line, character patterns are successively shifted in the shift register 332 to be outputted to the display device 34 when character patterns corresponding to 80 characters have been stored in the shift register 332.

Character patterns are outputted from the character generator 331 and shifted in the shift register 332 under the control from either the timing pulse corresponding to the form of 80 characters/line or that corresponding to the form of 132 characters/line selected by the display control circuit 333 and the changeover circuit 335.

Referring to FIG. 1 again, the constitution of the printer 40 will be described. In this embodiment, the print device is a known dot matrix printer of serial type which is able to print up to 132 characters/line. The printer 40 controls its print output. Also in the printer 40, a transmit/receive circuit 41, a memory 42, a microprocesor 45 and a line buffer 43 are connected to a bus 46. The printer 40 is constituted in nearly the same way as the display unit 30 described before. The transmit/receive circuit 41 controls data transfer from/to the transmit/receive circuit 31 within the display unit 30. The memory 42 is composed of a control table 421 and a picture memory 422 and is constituted in the same way as the above described memory 32. In the picture memory 422, however, character codes to be printed by the print device 44 are stored.

When the microprocessor 45 has received an interrupt signal indicating that all of the received data has been stored into the memory 42 and reception has been completed, the microprocesor 45 sets either the mode for 80 characters/line or the mode for 132 characters/line and successively outputs character codes from the picture memory 422 according to the picture size control information stored in the control table 421.

Character codes outputted from the picture memory 422 are successively transformed into character patterns by a character generator which is provided in the printer 40 and is not illustrated. The resultant character patterns are successively stored into the line buffer 43 as dot images. When dot images corresponding to either 80 characters or 132 characters have been stored into the line buffer 43 under the control of the above described picture size control information, the dot images are sent out to the print device 44. In this way, character codes stored in the picture memory 422 are edited into a character pattern line by line in the line buffer 43 and are thereafter successively printed by the print device 44.

Various processing operations of this embodiment will now be described referring to FIG. 1. The processing can be divided into on-line processing illustrated in FIG. 4, FIG. 6a and FIG. 6b and off-line processing illustrated in FIG. 5, FIG. 7a and FIG. 7b.

(On-line processing)

In FIG. 4, data processing blocks shown in FIG. 1 are illustrated more simply. Operation for the on-line processing will hereafter be described mainly referring to FIG. 4 and program flow charts illustrated in FIG. 6a and FIG. 6b. In FIG. 4, blocks 27 and 47 which are enclosed by broken lines are editing processor circuits. In fact, however, editing is carried out by the program.

Figure 2:
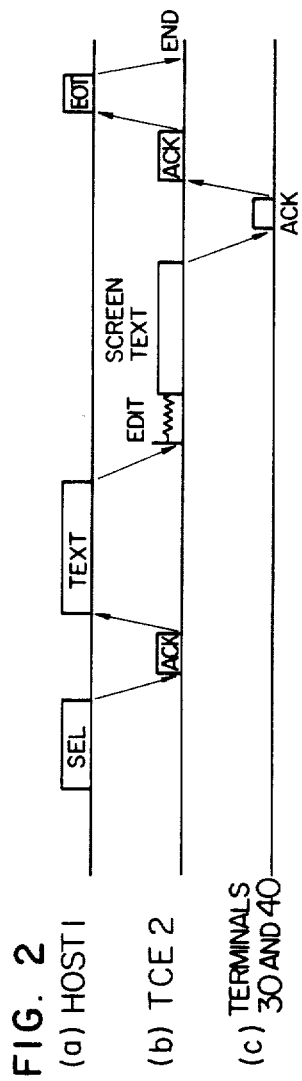
FIG. 2 shows the procedure for transmission of data between a host, a TCE and a terminal unit.

At first, the SEL code is sent from the host 1 to the TCE 2 as the request to send. This SEL code includes the address of a terminal unit to output the data which will be subsequently sent out by the host 1. The SEL code is received by the transmit/receive circuit 21 in the TCE 2. If the transmit/receive circuit 21 is ready for receiving, it returns the ACK signal to the host 1 as shown in FIG. 2. Upon receiving the ACK signal, the host 1 subsequently sends the text as shown in FIG. 3a to the TCE 2.

In the TCE 2, the transmitted code is checked in the transmit/receive circuit 21 and the received data is successively taken into a transmit/receive buffer 211. When the ETX is finally detected, data reception is completed. Should an error be detected by the CRC check, an NAK signal is returned to the host 1 to request data retransmission.

Subsequently, the command, control code and so on stored in the transmit/receive buffer 211 are read out therefrom to be analyzed by the microprocessor 23. The command transferred from the host 1 belongs to either to write group commands for writing the data sent from the host 1 into the memory in a terminal unit or to read group commands for reading the contents of the memory in the terminal unit and sending the data thus read out to the host 1. The case where a command belonging to write group commands is analyzed is especially significant in this embodiment and hereafter described.

There are several kinds of commands in the write group commands. There is a command used only for writing the data transferred from the host 1 into the picture memory 222. In this embodiment, however, the following processing is useful especially when the erase/write command has been analyzed.

In this case, the control byte CB is then analyzed in the microprocessor 23. As described before, the control byte CB is the control information for specifying the picture size, whereby one of the 960-character, 1,920-character, 2,560-character and 3,432-character modes is specified as the number of characters to be displayed or printed per one picture. Since the control byte CB is composed of 2 bytes, it not only specifies the picture size, but also includes control bits for specifying whether the keyboard is to be locked or not, whether the print output is to be fed or not, whether the print output is a hard copy or the output controlled by the printer control character, and so on.

When the control byte CB has been analyzed, the process for altering the picture size is carried out based upon the result of analysis. After the control byte CB has been written corresponding to the terminal unit address onto the picture size table 251, only one picture size is specified. Since the address of the terminal unit has previously been specified by the SEL code, the control byte CB is written into a picture size area corresponding thereto.

Subsequently, the data is to be written into the picture memory 222. However, it is common that prior to the writing operation the contents of the picture memory in a work station WS, for example, the contents of the picture memory 322 in the display unit 30 are read out. The purpose of the readout is either to partially rewrite the contents of the screen memory or to edit data in the TCE 2 and thereafter write the edited data into the picture memory 322 within the display unit 30. In the initial state, however, such operation is not carried out and the received data taken into the transmit/receive buffer 211 from the host 1 is edited by the microprocessor 23 and successively written into the picture memory 222. The major editing is a process for converting the received data into the internal code and producing character codes.

After editing all of the data and the writing of character codes into the picture memory 222, the microprocessor 23 transfers the picture size control information corresponding to the address of a terminal unit from the picture size table 251 to the control table 221 in order to output the data toward the terminal unit such as the display unit 30.

The microprocessor 23 starts the device control circuit 24. The device control circuit 24 sends the data read out of the control table 221 and the picture memory 222 to a specified work station, for example, the display unit 30 in the format illustrated in FIG. 3b. The display unit 30, which is a work station, receives the data via the transmit/receive circuit. If the data has been normally received, the display unit 30 returns the ACK signal to the TCE 2. If the work station is busy or the CRC check indicates an error, the work station returns the NAK signal to the TCE 2 to request retransmission of the data.

If the TCE 2 has received the NAK signal from a work station, it retransmits the data. If the TCE 2 has received the ACK signal, it sends out the ACK signal to the host 1. Thereupon the host 1 sends out the EOT signal which means the normal completion of the reception sequence to the TCE 2. Upon receiving the EOT signal, a sequence of operation in the TCE 2 for receiving data from the TCE 2 has been completed. Thereafter, the display unit 30 which is a work station begins its processing operation for the printer 40.

In this embodiment, a read group command is not so important. When a command has been found to belong to a read group as a result of command analysis, the data stored in the picture memory of a designated terminal unit, for example, the data stored in the picture memory 322 of the display unit 30 is read out and the picture size table 251 is searched. And the microprocessor 23 edits the data to be sent to the host 1. After editing the data, the edited data is sent to the host 1. Upon receiving the ACK signal from the host 1, the terminal unit sends the EOT signal to the host 1, the sequence of read processing being completed.

Processing operation in a terminal unit will now be described. The basic operation is common to the display unit 30 and the printer 40.

For instance, it is assumed that the control information and character codes are sent from the TCE 2 to the control table 421 and the picture memory 422 in order to print the data on the printer 40. If the transmit/receive circuit 41 in the printer 40 normally receives the data having the format illustrated in FIG. 3b, this data is written into the table 421 and the picture memory 422.

Thereafter the microprocessor 45 analyzes the control information composed of 2 bytes stored in the control table 421. Unless the print order is found, the microprocessor 45 sends the ACK signal to the TCE 2. If the print order is found, the following operation ensures. That is to say, the control bit for specifying the picture size included in the control byte CB which is the control information is analyzed.

If the result of analysis indicates the mode of 132 characters/line, i.e., the mode of 3,432 characters in total, character codes stored in the picture memory 422 are read out by 132 characters which corresponds to one line and then transformed into dot patterns in the character generator to be successively stored into the line buffer 43. Then a pattern of 132 characters per line is printed by the print device 44. The letter N signifies the number of lines which have been printed. The value of N is increased by one whenever a line is printed by the print device 44. The number of this increase is programable. For the picture size mode of 3,432 characters, 26 lines must be printed. When the value of N has reached "26", it is deemed that the print operation for patterns corresponding to 3,432 characters has been completed. The transmit/receive circuit 41 informs the TCE 2 of the printing completion, printing being completed.

If the above described analysis of picture size specification indicates one of the modes of 960 characters, 1,920 characters and 2,560 characters, 80 characters must be printed per line. Accordingly, the processing passes into the right branch of the flow illustrated in FIG. 6b. In this case, the respective modes differ only in the number of printed lines. Other respects are the same as those of the above described operation. That is to say, when the picture size specification is the mode of 1,920 characters, 24 lines must be printed. When the value of N has reached "24", therefore, the printing operation is completed. In the same way, the printing operation is completed when the value of N has reached "12" for the 960-character mode and when the value of N has reached "32" for the 2,560-character mode.

Heretofor, the output operation in the printer 40 for on-line processing has been described. The operation may also be basically true of the display unit 30. That is to say, if the display order results from the analysis of the control information stored in the control table 321, processing in the display unit 30 becomes effective. In this case, character codes are successively outputted from the picture memory 322 under the control by the display control circuit 333 and based upon the timing signal fed from one of the oscillators 336 and 337 which is selected by the picture size specifying information, as described before. For the 3,432-character mode, these patterns are successively transferred to the display device 34 whenever character patterns corresponding to 132 characters have been stored into the shift register 332. Such operation is successively repeated. As a result, character patterns are displayed over 26 lines on the display picture. For the 960-character, 1,920-character or 2,560-character mode, 80 characters are displayed per line. These modes differ only in the timing signal and the number of displayed lines from the above described 3,432-character mode. The essential operation in these modes is similar to that of the 3,432-character mode.

According to this embodiment, it is thus possible to arbitrarily select a mode of picture size to be displayed or printed in a terminal unit.

(Off-line processing)

The off-line processing operation will now be described referring to FIG. 5, FIG. 7a and FIG. 7b. The off-line processing means the processing for converting the character patterns displayed on the picture of the display device 34 into the hard copy output at the print device 44. For the character patterns displayed in the form of 80 characters/line by 24 lines on the display picture, it has been performed in the prior art as well to output the character patterns without modification toward the print device 44, i.e., to print them in the form of 80 characters/line by 24 lines. Accordingly, such processing is not especially important. This embodiment is rather important when character patterns displayed in the form of 132 characters/line by n lines, for example, are to be printed with altering of the print mode of 80 characters/line by m lines for the printer to the new print mode of 132 characters/line by n lines.

Prior to hard copy printing for the display picture, a printer to effect printing is designated at first. As shown in FIG. 7a the printer is specified by depressing a particular key on the keyboard 37, for instance the IDENT key and entering the terminal unit address of the printer unit through numerical keys. This terminal unit address is read by the keyboard adaptor 36. At the same time, it is checked whether the printer is ready or not, for instance, whether the power has been turned on or not, by the polling from the TCE 2. If the result indicates an error, the error is reported to the display unit 30 to request a re-specified address. In the absence of an error, the terminal unit address is transferred from the display unit 30 to the TCE 2 and registered into the printer matrix table 252. Assuming that the printer 40 having a terminal unit address "UA2" is specified as the hard copy printer for the display picture on the display unit 30 having a terminal unit address "UA1", the terminal unit address "UA2" is registered corresponding to the terminal unit address on the printer matrix table 252.

After a printer to print the data has been specified, the operation illustrated in FIG. 7b is carried out. The device control circuit 24 in the TCE 2 issues a polling signal to respective terminal units to search for the request fed from a terminal unit. When under this situation depression of the print direction key used for hard copy printing and placed on the keyboard 37 of the display unit 30 is detected, the printer matrix table 252 is referenced to check whether the terminal unit address of the printer to be used for printing has been registered or not. If the address is not registered, an error report is issued to the display unit 30 to urge the operation for specifying the terminal unit address of the printer as illustrated in the flow of FIG. 7a.

If the address has already been registered in the printer matrix table 252, the read operation for reading the contents of the picture memory 322 in the display unit 30, i.e., the data to be printed for hard copy printing is initiated. This operation is started by the read command issued from the picture memory 322 to the display unit 30. The data read out from the picture memory 322 is sent to the TCE 2 through the bus 38 and the transmit receive circuit 31 and is temporarily stored in the picture memory 222 within the TCE 2.

Figure 5:
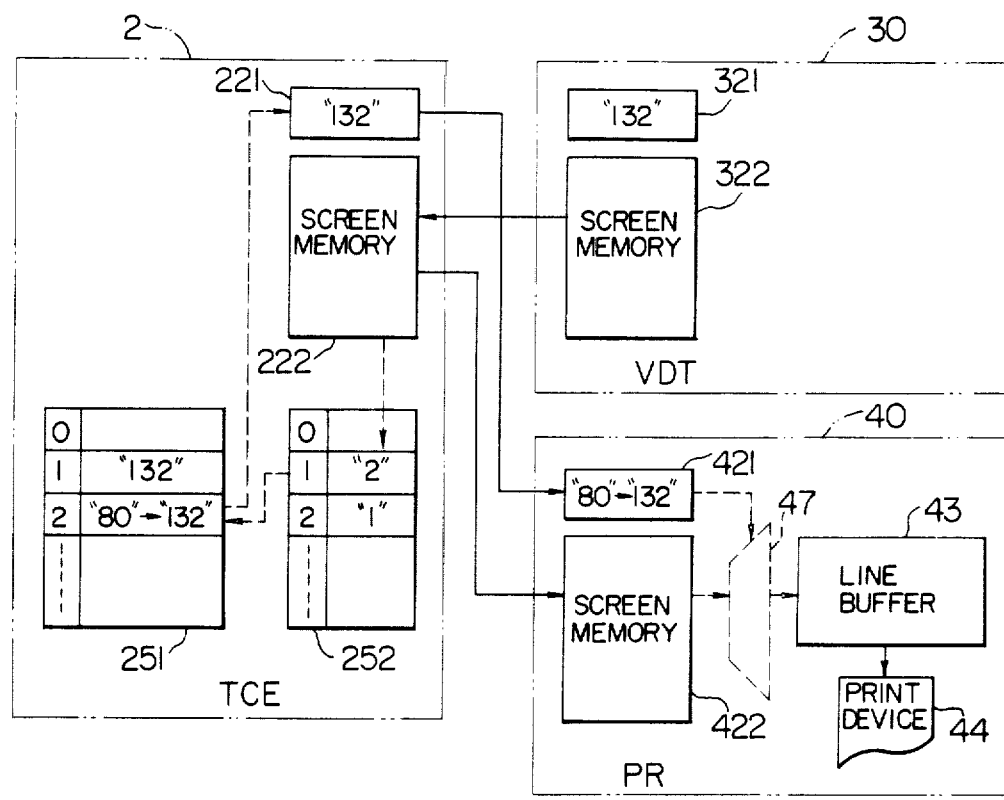
Figure 6A:
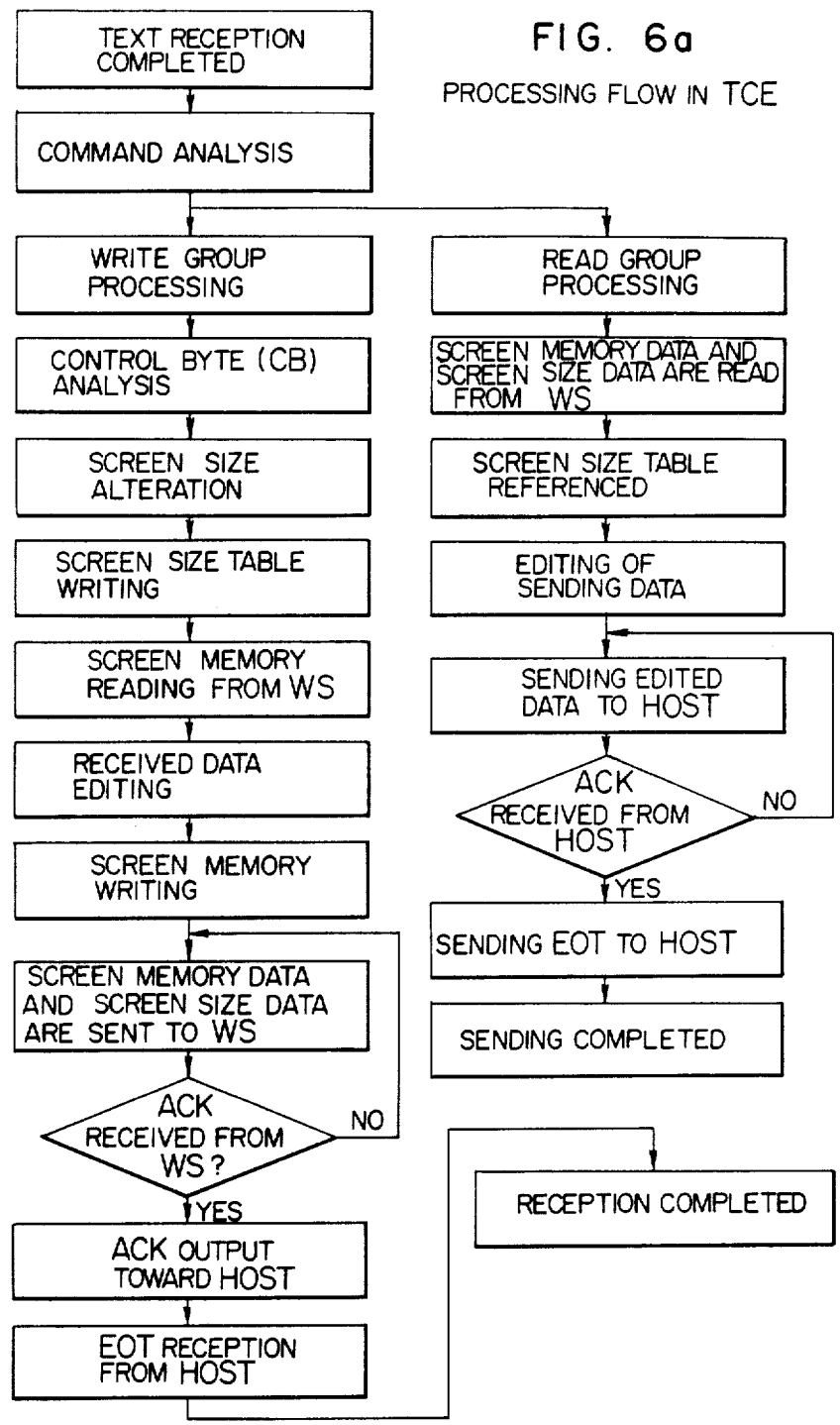
FIG. 6a and FIG. 6b are processing flow charts of the TCE and a terminal unit for illustrating the operation.
Figure 6B:
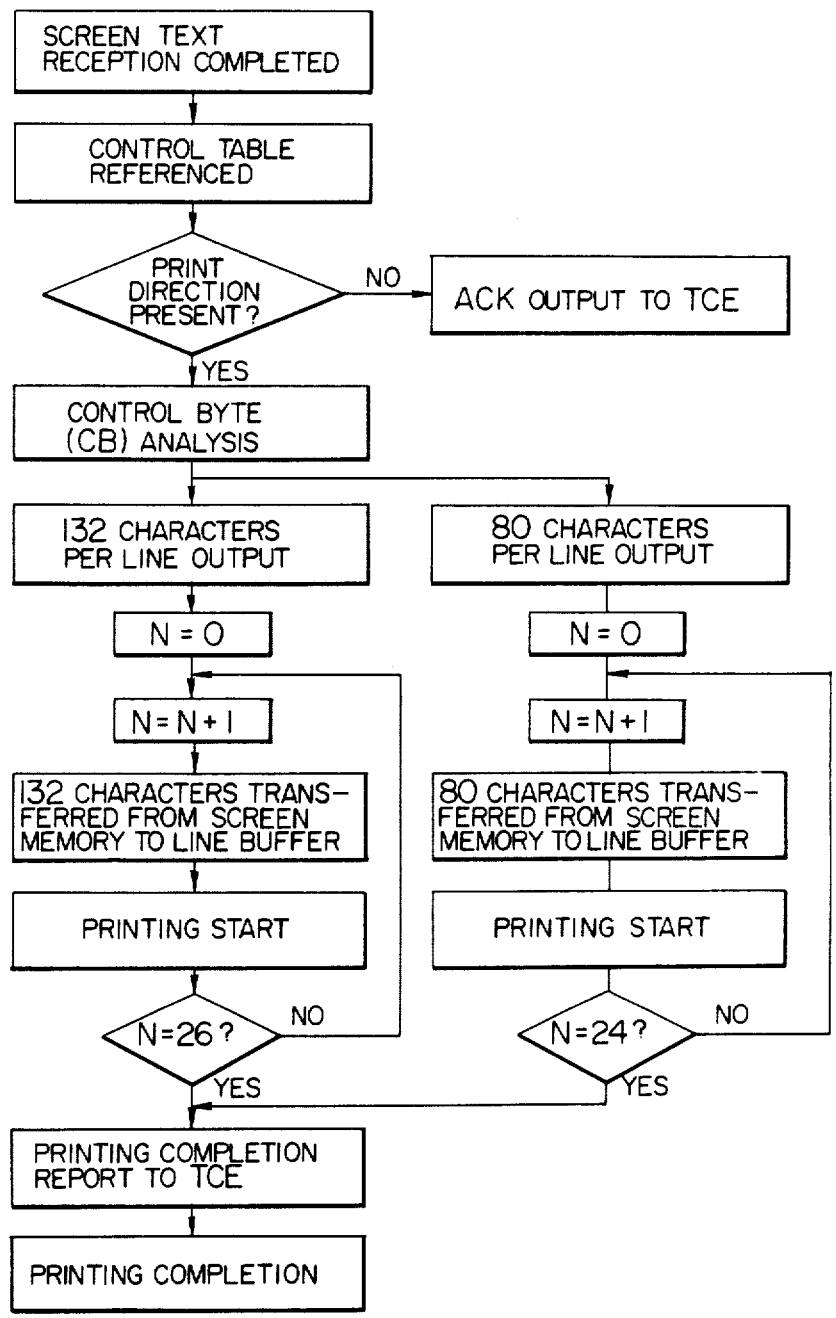

Then, the picture size table 251 and the printer matrix table 252 are referenced as shown in FIG. 5. In this embodiment, the terminal unit address "2" has already been registered corresponding to the terminal unit address "1" into the printer matrix table 252. Accordingly, the picture size corresponding to the terminal unit address concerned stored in the picture size table 251 is read out to be compared by the microprocessor 23.

If the mode representing the number of characters to be displayed on the picture of the display device 34 in the display unit 30 agrees with the mode representing the number of characters to be printed on the print device 44 in the printer 40, the contents of the picture memory 222 in the TCE 2 are transferred to the printer 40 to be stored into the picture memory 422. Of course, the picture size information which is stored corresponding to the terminal unit address "2" in the picture size table 251 is set into the control table 221. As a result, the picture size information is established so as to meet the picture size of the printer 40, i.e., so as to have the same mode as that of the picture size of the printer 40. The picture size information is transferred to the printer 40 to be written into the control table 421. When the data and picture size control information have entirely been written respectively into the picture memory 422 and the control table 421 in the printer 40, the transmit/receive circuit 41 in the printer 40 transmits the ACK signal signifying the normal reception toward the TCE 2. Upon receiving the ACK signal, the TCE 2 completes the transfer operation of print data. Thereafter, the print operation of the print device 44 is started in the printer 40. Unless the ACK signal is received, data stored in the picture memory 222 and the control table 221 are retransmitted. Then, the printer 40 performs the print processing according to the processing flow illustrated in FIG. 6b. The print device 44 is a known serial printer of wire matrix type and its print operation is also well known. Accordingly, further description is unnecessary. The difference is found only in the fact that printing is carried out in the form of 80 characters/line or in the form of 132 characters/line according to a picture size mode.

In the following, it is supposed that the picture size mode in the display unit 30 specifies the form of 132 characters/line by 26 lines whereas the picture size mode specifying the form of 80 characters/line by 24 lines has previously been determined in the printer 40 and the contents of the displayed picture are to be printed to yield the hard copy in the print device 44.

In this case, the picture size of the above described display unit 30 does not agree with that of the printer 40 in a comparison operation. As shown in FIG. 5, the picture size mode signifying the 80 characters/line which has been stored corresponding to the terminal unit address "2" of the printer 40 in the picture size table 251 is then altered to the picture size mode signifying the 132 characters/line. According thereto, the picture size control information in the control table 221 is newly specified. Then, the contents of the control table 221 and the picture memory 222 are transferred to the printer 40 to be stored in the control table 421 and the picture memory 422. Subsequent operation is the same as that described before and carried out according to the flow shown in FIG. 6b.

As evident from the above description, it is possible to perform printing while matching the picture size mode of the printer 40 to that of the display unit 30. As a result of the above described embodiment, the picture size mode signifying the form of 132 characters/line by 26 lines has been predetermined in the printer 40. Should the picture size mode signifying the form of 80 characters/line by 24 lines be newly determined in the display unit 30, however, the picture size mode signifying the form of 80 characters/line by 24 lines is stored corresponding to the terminal unit address "UA1" in the picture size table 251 in the same operation as described before. And when the contents of the picture displayed on the display unit 30 are to be outputted as the hard copy on the printer 40, the picture size mode stored corresponding to the terminal unit address "UA2" in the picture size table 251 is altered to the picture size mode signifying the form of 80 characters/line by 24 lines. Since such operation is similar to that described before, it can be easily understood.

An embodiment of the present invention has been heretofore described. However, the present invention is not restricted to the above described embodiment. Various modifications may be applied to the embodiment. For instance, a larger number of display units and printers may be connected to the TCE 2. The concept of the present invention may be applied to this case as well and the embodiment may be easily obtained.

Further, it is easily understood that the printer 40 may be replaced by the display unit 30. In this case, hard copy printing cannot be carried out. However, it becomes possible to match the picture size mode of the second display unit to that of the first display unit and write the contents of the picture memory of the first display unit into the picture memory of the second display unit in order to display said contents on the display device of the second display unit.

Further, various known kinds of printers may be used as the printer 40.

What is claimed is:
1. A character output system comprising:
(a) a display device;
(b) first memory means connected to said display device for storing data to be output in a plurality of lines on said display device;
(c) means including a first table for storing display-mode information corresponding to the amount of data to be displayed in a line on said display device;
(d) means connected to said first memory means and responsive to the information stored in said first table for editing the line-length of data read out from said first memory means;
(e) a print device;
(f) second memory means connected to said print device for storing data to be printed in a plurality of lines by said print device;
(g) means including a second table for storing print-mode information corresponding to the amount of data to be printed in a line by said print device;
(h) means connected to said second memory means and responsive to the information stored in said second table for editing the line-length of data read out from said second memory means;
(i) a terminal control unit connected to said first and second memories for transmitting data to be output to said display device and/or said print device; and
(j) means including a third table connected to said terminal control unit for storing a plurality of mode control information for each of said display device and said print device and for selecting mode control information to be sent to said display device and said print device.

2. A character output system according to claim 1, further comprising means for changing the data stored in said first memory means to be displayed on said display device and means for transmitting the changed data to said second memory means.

3. A character output system comprising at least one display unit, at least one printer and a terminal control unit for controlling said display unit and said printer, wherein said display unit includes:
a display device;
first memory means for temporarily storing data to be displayed on said display device as character codes;
display control means for converting data read out from said first memory means into character patterns and for feeding the character patterns to said display device;
means including a first table for storing first mode control information indicating the amount of data to be displayed on a single line on said display device for use in controlling said display control means according to a desired display mode; and
first processing means for editing data read out from said first memory means according to said first mode control information stored in said first table; wherein said printer includes:
a print device;
second memory means for converting data to be printed by said print device into character codes and for temporarily storing the character codes;
means including a second table for storing second mode control information indicating the amount of data to be printed on a single line by the print device according to a desired print mode;
second processing means for editing data read out from said second memory means according to said second mode control information stored in said second table; and
buffer means for temporarily storing character patterns corresponding to the data which has been edited by said second processing means to be transferred to said print device; and wherein said terminal control unit includes:
third memory means for storing data to be stored in said first or second memory means;
means including a third table for registering arbitrary mode control information among a plurality of predetermined modes in table locations corresponding to the respective addresses given to said display unit and said printer to indicate the number of characters to be displayed on said display device or to be printed by said print device for a single line; and
means including a fourth table for temporarily storing the first and the second mode control information which has been selected from said third table to be stored into said first or second table.

4. An information output system according to claim 3, wherein said terminal control unit is connected to a host and the first and second mode control information stored in said third table is rewritten by control information fed from said host.

5. An information output system according to claim 3, wherein said terminal control unit further comprises:
means including a fifth table for registering at least the address of a printer which is the destination of print data corresponding to the display unit in order to print the contents displayed on the display unit in the form of a hard copy; and
means for searching said fifth table to compare the first mode control information of a display unit which is registered in said third table with the second mode control information of a printer which is the destination of data transfer and for rewriting the second mode control information in said third table to match the first mode control information of the display unit in case of disagreement between said first and second mode control information.

6. An information output system according to claim 5, wherein said display unit comprises input means for entering the information to specify at least a printer to which the print data is to be destined and the address of the printer in said fifth table can be specified by this information fed from said input means;
second processing means for editing data read out from said second memory means according to said second mode conrol information stored in said second table; and
buffer means for temporarily storing character patterns corresponding to the data which has been edited by said second processing means to be transferred to said print device; and wherein said terminal control unit includes:
third memory means for storing data to be stored in said first or second memory means;
means including a third table for registering arbitrary mode control information among a plurality of predetermined modes in table locations corresponding to the respective addresses given to said display unit and said printer to indicate the number of characters to be displayed on said display device or to be printed by said print device for a single line; and
means including a fourth table for temporarily storing the first and the second mode control information which has been selected from said third table to be stored into said first or second table.

* * * * *

UNITED STATES PATENT AND TRADEMARK OFFICE
CERTIFICATE OF CORRECTION

PATENT NO. : 4,580,242
DATED : April 1, 1986
INVENTOR(S) : Y. Suzuki et al

It is certified that error appears in the above—identified patent and that said Letters Patent is hereby corrected as shown below:

On the title page add:

Claim for Priority

Japanese Patent Application No. 58091/82
filed April 9, 1982

Signed and Sealed this

Nineteenth Day of August 1986

[SEAL]

Attest:

DONALD J. QUIGG

Attesting Officer        Commissioner of Patents and Trademarks